UNITED STATES PATENT OFFICE.

CHARLES F. A. HINRICHS, OF BROOKLYN, NEW YORK.

IMPROVEMENT IN MINERAL LAMP-WICKS.

Specification forming part of Letters Patent No. 196,148, dated October 16, 1877; application filed June 25, 1877.

*To all whom it may concern:*

Be it known that I, CHARLES F. A. HINRICHS, of Brooklyn, in the county of Kings and State of New York, have invented an Improvement in Mineral Wicks for Lamps, of which the following is a specification:

Plaster-of-paris has been used in the manufacture of mineral wicks for lamps, as may be seen by reference to Letters Patent Nos. 179,049 and 183,036.

My invention is an improvement in the manufacture of mineral wicks, by means of which I dispense with the combustible carbonaceous material and with the fibrous substances heretofore employed; and to effect these objects I use grains of porous material, mixed with plaster and moistened with water.

My improved wick does not require to be burned or baked; on the contrary, it is preferably simply mixed and pressed into a mold of the proper size and shape, or into the tubes containing cotton or similar materials below the space that is filled with my composition.

I employ slaked lime or finely-ground brick-dust as the porous material that I mix with the plaster, and, according to the volatile character of the oil, so the proportions of the material will vary.

I find it preferable to employ about equal parts, by weight, of the porous material, such as air-slaked lime or finely-pulverized brick, and mix them together thoroughly while in a dry condition, and for this purpose the materials may be ground together. I then moisten the said mixed materials sufficiently to render them plastic, and introduce the same into the space prepared for the composition in the wick-tube, or else into a mold of corresponding shape, into which the materials are sufficiently solidified by pressure, and afterward removed and inserted into the lamp-wick tube.

I claim as my invention—

The improved mineral wick consisting of grains of porous material united by plaster, as set forth.

Signed by me this 16th day of June, A. D. 1877.

C. F. A. HINRICHS.

Witnesses:
GEO. T. PINCKNEY,
HAROLD SERRELL.